(12) United States Patent
Matsuo (10) Patent No.: US 8,766,935 B2
(45) Date of Patent: Jul. 1, 2014

(54) ELECTROSTATIC CAPACITANCE-TYPE INPUT DEVICE AND METHOD OF MANUFACTURING THEREOF

(75) Inventor: Mutsumi Matsuo, Nagano (JP)

(73) Assignee: Japan Display West, Inc., Aichi-Ken (JP)

( * ) Notice: Subject to any disclaimer, the term of this patent is extended or adjusted under 35 U.S.C. 154(b) by 543 days.

(21) Appl. No.: 12/962,043

(22) Filed: Dec. 7, 2010

(65) Prior Publication Data

US 2011/0140266 A1    Jun. 16, 2011

(30) Foreign Application Priority Data

Dec. 15, 2009  (JP) ................................ P2009-283728

(51) Int. Cl.
 *G06F 3/041* (2006.01)
 *G06F 3/045* (2006.01)

(52) U.S. Cl.
 USPC .......................................... 345/173; 345/174

(58) Field of Classification Search
 USPC ................................. 345/173, 174
 See application file for complete search history.

(56) References Cited

U.S. PATENT DOCUMENTS

| 2009/0236151 | A1  | 9/2009  | Yeh et al. | |
|---|---|---|---|---|
| 2009/0244021 | A1* | 10/2009 | Matsuo et al. | 345/173 |
| 2011/0163350 | A1* | 7/2011  | Yokoyama et al. | 257/100 |

FOREIGN PATENT DOCUMENTS

| JP | 2000-351170 | | 12/2000 |
|---|---|---|---|
| JP | 2008-310550 | | 12/2008 |
| JP | 3149113 | * | 2/2009 |
| JP | 2009-230735 | | 10/2009 |
| JP | 2009-237673 | * | 10/2009 |
| JP | 2011-086122 | | 4/2011 |

OTHER PUBLICATIONS

Japanese Office Action mailed Jun. 18, 2013 for corresponding Japanese Appln. No. 2009-283728.
Japanese Office Action issued in connection with Japanese Patent Application No. 2009-283728, mailed on Dec. 17, 2013. (1 page).

* cited by examiner

*Primary Examiner* — James Mitchell
(74) *Attorney, Agent, or Firm* — K&L Gates LLP (57) ABSTRACT

An electrostatic capacitance-type input device includes: a first translucent conductive film that configures a first electrode that extends in a first direction in an input area on a substrate and second electrodes that extend in a second direction intersecting the first direction in the input area and are disconnected in intersection portions with the first electrode; an interlayer insulating film that is formed at least in areas overlapping the intersection portions; and a second translucent conductive film that configures relay electrodes formed on the interlayer insulating film to have sheet resistance lower than that of the first translucent conductive film and electrically connecting the second electrodes disconnected in the intersection portion by being electrically connected to the second electrodes in an area in which the interlayer insulating film is not formed and a peripheral wiring extending in a peripheral area of the substrate located to the outer side of the input area.

7 Claims, 7 Drawing Sheets

ELECTROSTATIC CAPACITANCE-TYPE INPUT DEVICE AND METHOD OF MANUFACTURING THEREOF

CROSS REFERENCES TO RELATED APPLICATIONS

The present application claims priority to Japanese Priority Patent Application JP 2009-283728 filed in the Japan Patent Office on Dec. 15, 2009, the entire contents of which is hereby incorporated by reference.

BACKGROUND

The present application relates to an electrostatic capacitance-type input device that detects an input position based on a change in the electrostatic capacitance coupled with an input position detecting electrode, and a method of manufacturing thereof.

Among electronic apparatuses such as cellular phones, car navigation systems, personal computers, ticket-vending machines, and banking terminals, there are apparatuses, in which an input device termed a touch panel is arranged on the surface of a liquid crystal device or the like, allowing a user to input information while referring to an image displayed in an image display area of the liquid crystal device. Among such input devices, in electrostatic capacitance-type input devices, the first electrode that extends in the first direction in an input area on a substrate and the second electrode that is disconnected at the intersection portion with the first electrode are formed of the first ITO film. In addition, in an area overlapping the intersection portion, an interlayer insulating film is formed, and on the interlayer insulating film, a relay electrode that electrically connects the disconnected second electrodes to each other is configured by the second ITO film. In an outer peripheral area of the input area on the substrate, peripheral wirings that are electrically connected to the first electrode and the second electrode are formed. Here, since low resistance of the peripheral wirings is necessary, the peripheral wirings are formed from a metal film such as an APC film that is formed from an alloy of silver, palladium, and copper (for example, see JP-A-2008-310550).

SUMMARY

However, according to the configuration described in JP-A-2008-310550, a total of four patterning processes including formation of a pattern of peripheral wirings, formation of a pattern of the first ITO film, formation of a pattern of an interlayer insulating film, and formation of a pattern of the second ITO film are necessary. Thus, there is a problem in that the productivity is low.

Thus, it is desirable to provide an electrostatic capacitance-type input device capable of forming the first electrode, the second electrode, an interlayer insulating film, a relay electrode, and peripheral wirings by a total of three patterning processes and a method of manufacturing the electrostatic capacitance-type input device.

According to an embodiment, there is provided an electrostatic capacitance-type input device including: a first translucent conductive film that configures a first electrode that extends in a first direction in an input area on a substrate and second electrodes that extend in a second direction intersecting the first direction in the input area and are disconnected in intersection portions with the first electrode; an interlayer insulating film that is formed at least in areas overlapping the intersection portions; and a second translucent conductive film that configures relay electrodes formed on the interlayer insulating film to have sheet resistance lower than that of the first translucent conductive film and electrically connecting the second electrodes disconnected in the intersection portion by being electrically connected to the second electrodes in an area in which the interlayer insulating film is not formed and a peripheral wiring extending in a peripheral area of the substrate located to the outer side of the input area.

According to another embodiment, there is provided a method of manufacturing an electrostatic capacitance-type input device. The method includes the steps of: forming a first electrode that extends in a first direction within an input area on a substrate and second electrodes that extend in a second direction intersecting the first direction in the input area and are disconnected in intersection portions with the first electrode by forming a first translucent conductive film on the substrate and then patterning the first translucent conductive film by using photolithography technology; forming an interlayer insulating film at least in areas overlapping the intersection portions by forming an insulating film on the substrate and then patterning the insulating film by using photolithography technology; and forming relay electrodes that electrically connect the second electrodes disconnected in the intersection portions and a peripheral wiring that extends in a peripheral area located on the outer side of the input area of the substrate by forming a second translucent conductive film with sheet resistance lower than that of the first translucent conductive film on the substrate and then patterning the second translucent conductive film by using photolithography technology.

As described above, according to an embodiment, the first electrode, the second electrode, the interlayer insulating film, the relay electrode, and the peripheral wiring of the electrostatic capacitance-type input device can be formed of three films including the first translucent conductive film, the interlayer insulating film, and the second translucent conductive film. In other words, the first electrode, the second electrode, the interlayer insulating film, the relay electrode, and the peripheral wiring can be formed by performing a total of three patterning processes. Therefore, according to an embodiment, the productivity is high. In addition, since the second translucent conductive film has sheet resistance lower than the first translucent conductive film, the peripheral wiring having low resistance can be configured without forming the peripheral wiring with a metal film.

In the embodiments, it is preferable that the first translucent conductive film configures an auxiliary wiring that extends so as to overlap the peripheral wiring and is electrically connected to the peripheral wiring in parallel. In such a case, since the peripheral wiring and the auxiliary wiring are electrically connected in parallel, the wiring resistance can be decreased. In addition, a redundant wiring structure capable of transferring a signal even in a case where one wiring is cut off can be realized.

In an embodiment, it is preferable that the interlayer insulating film is formed in an area overlapping the first electrode and in areas overlapping the second electrodes. In such a case, there is an advantage in that the first and second electrodes formed in advance are not etched when the second translucent conductive film is patterned. Accordingly, as the second translucent conductive film, a translucent conductive film such as a translucent conductive film, in which an IZO (Indium Zinc Oxide) layer, a silver-based metal layer (a silver layer or an alloy layer having silver as its main component), and an IZO layer are stacked, that can be etched with an etching material having etching selectivity for the first translucent conductive film can be used. In addition, a translucent conductive film such as a translucent conductive film, in which an ITO (Indium Tin Oxide) layer, a silver-based metal layer (a silver layer or an alloy layer having silver as its main component), and an ITO layer are stacked, that has no etching selectivity for the first translucent conductive film can be used as the second translucent conductive film.

In this case, it is preferable that the interlayer insulating film is formed between layers of the peripheral wiring and the auxiliary wiring. In such a case, the auxiliary wiring formed in advance is not etched with an etching material used for forming the peripheral wiring when the peripheral wiring is formed by being patterned. Accordingly, as the second translucent conductive film, a translucent conductive film such as a translucent conductive film, in which an IZO layer, a silver-based metal layer, and an IZO layer are stacked, that can be etched with an etching material having etching selectivity for the first translucent conductive film can be used. In addition, a translucent conductive film such as a translucent conductive film, in which an ITO layer, a silver-based metal layer, and an ITO layer are stacked, that has no etching selectivity for the first translucent conductive film can be used as the second translucent conductive film.

In the embodiment, it is preferable that the interlayer insulating film is formed only in areas of the input area that overlap the intersection portions. In such a case, since there is no unnecessary interlayer insulating film in the input area, the optical transparency of the input area can be increased.

In the case, it is preferable that the second translucent conductive film has etching selectivity for the first translucent conductive film.

In the embodiment, it is preferable that the second translucent conductive film is a translucent conductive film in which an IZO layer, a silver-based metal layer, and an IZO layer are stacked. Since the translucent conductive film has etching selectivity for the first translucent conductive film, the first and second electrodes formed in advance are not etched when the second translucent conductive film is etched. Accordingly, there is an advantage in that there is no strict limitations on the formation range of the interlayer insulating film, so that a configuration in which the interlayer insulating film is formed only in an area of the input area that overlaps the intersection portions or the like can be employed.

In the embodiment in which the first electrode or the second electrode is covered with the interlayer insulating film or the like, it is preferable that a translucent conductive film in which an ITO layer, a silver-based metal layer, and an ITO layer are stacked may be used as the second translucent conductive film.

The electrostatic capacitance-type input device according to the embodiment, for example, is used for configuring an input device-attached electro-optical apparatus. In the input device-attached electro-optical apparatus, an electro-optical panel used for generating an image is configured on a side of the substrate that is opposite to the input operation side thereof.

An electro-optical apparatus with the input device according to the embodiment is used in electronic apparatuses such as a cellular phone, a car navigation system, a personal computer, a ticket-vending machine, and a banking terminal.

Additional features and advantages are described herein, and will be apparent from the following Detailed Description and the figures.

DETAILED DESCRIPTION

Embodiments of the present application will be described below in detail with reference to the drawings.

In the drawings referred to in the description presented below, in order to allow each layer and each member to be of a size such that it is possible to recognize them in the drawings, the scales of the layers and the members are differently set.

Embodiment 1

Basic Configuration

Entire Configuration of Input Device-Attached Electro-Optical Apparatus

Figure 1:
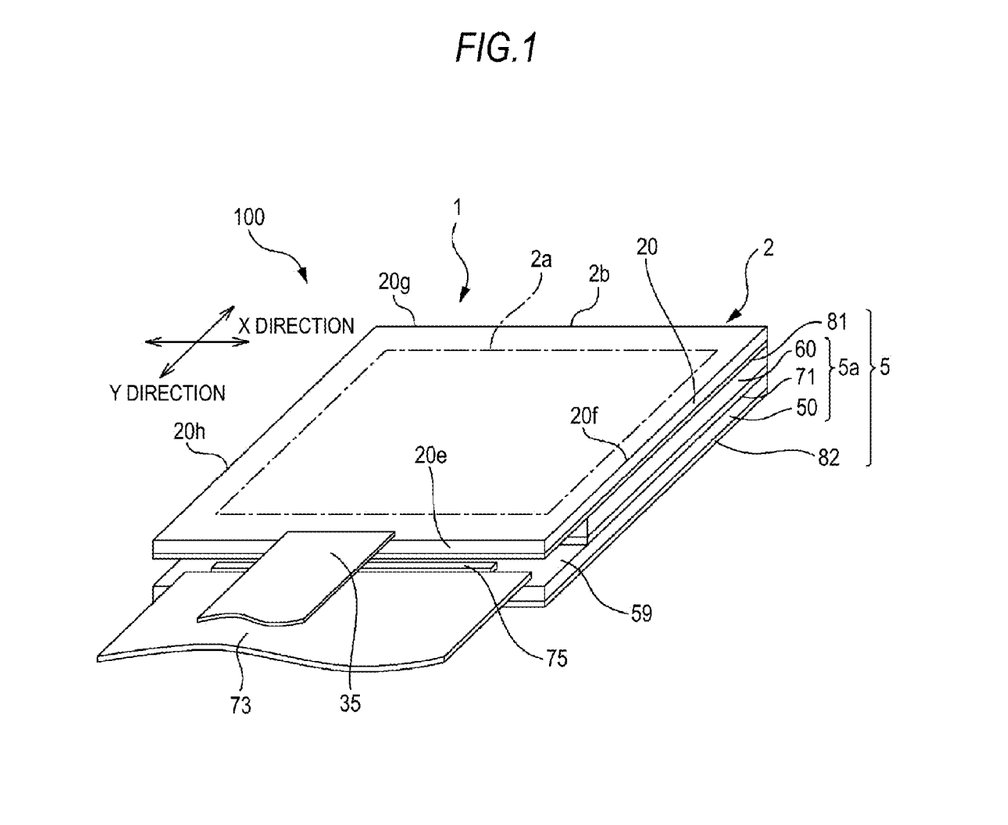
FIG. 1 is an explanatory diagram schematically showing the entire configuration of an input device-attached electro-optical apparatus having an electrostatic capacitance-type input device according to Embodiment 1 of the present application.
Figure 2A:
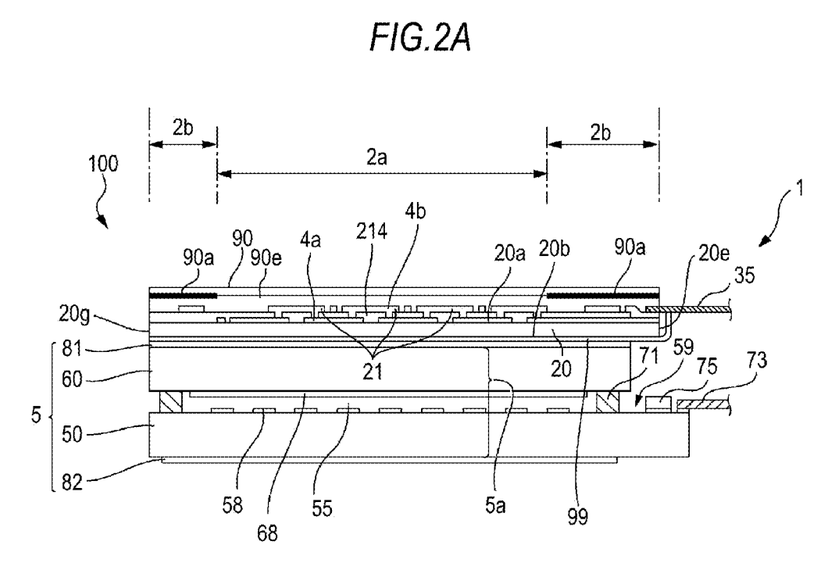
FIGS. 2A and 2B are explanatory diagrams schematically showing the cross-sectional configurations of input device-attached electro-optical apparatuses according to Embodiment 1 of the present application.
Figure 2B:
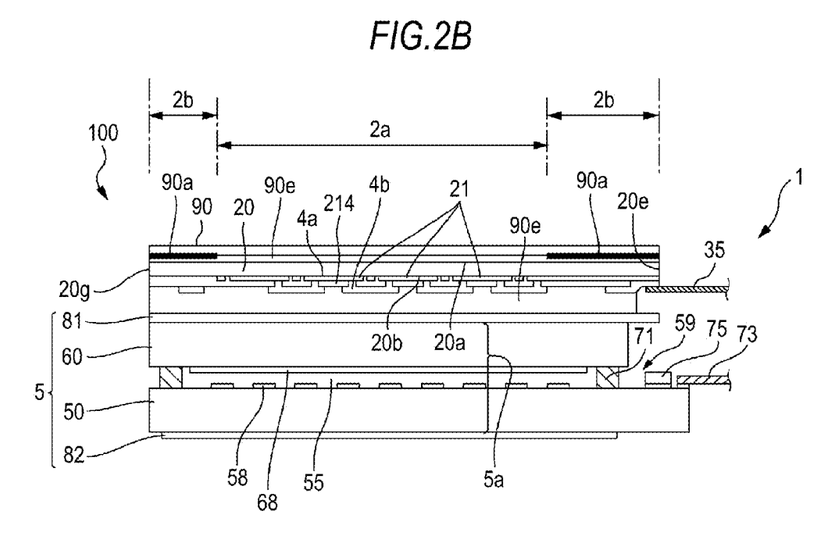

FIG. 1 is an explanatory diagram schematically showing the entire configuration of an input device-attached electro-optical apparatus having an electrostatic capacitance-type input device according to Embodiment 1 of the present application. FIGS. 2A and 2B are explanatory diagrams schematically showing the cross-sectional configurations of input device-attached electro-optical apparatuses according to Embodiment 1 of the present application. FIG. 2A is an explanatory diagram of a configuration example in which input position detecting electrodes are disposed on the first face side of a substrate that is located on the input operation side thereof. FIG. 2B is an explanatory diagram of a configuration example in which the input position detecting electrodes are disposed on the second face side of the substrate that is located on a side opposite to the input operation side of the substrate.

As shown in FIG. 1, generally, the input device-attached electro-optical input apparatus 100 of this embodiment has an image generating device 5 that is configured by a liquid crystal device or the like and an electrostatic capacitance-type input device 1 disposed on a face of the image generating device 5 that is located on a side, from which display light is emitted, in an overlapping manner. The electrostatic capacitance-type input device 1 includes an input panel 2 (touch panel), and the image generating device 5 includes a liquid crystal panel serving as an electro-optical panel 5a (display panel). In this embodiment, both the input panel 2 and the electro-optical panel 5a have a planar shape of a rectangle, and the center area of the electrostatic capacitance-type input device 1 and the input device-attached electro-optical apparatus 100 in the plan view is an input area 2a. An area of the image generating device 5 and the input device-attached electro-optical apparatus 100 that overlaps the input area 2a in the plan view is an image forming area. To a side of the input panel 2 on which an end portion 20e is positioned, a flexible wiring substrate 35 is connected. In addition, to a side of an electro-optical panel 5a on which the end portion 20e is positioned, a flexible wiring substrate 73 is connected.

In FIG. 1 and FIGS. 2A and 2B, the image generating device 5 is an active matrix-type liquid crystal display device of transmission type or semi-transmission reflection type. On a side (a side opposite to the display light emitting side) of the electro-optical panel 5a that is opposite to a side on which the input panel 2 is disposed, a back light device (not shown in the figure) is disposed. The back light device, for example, has a light guiding plate, which has translucency, disposed on a side of the electro-optical panel 5a that is opposite to the side on which the electrostatic capacitance-type input device 1 is disposed in an overlapping manner and a light source such as a light emitting diode that emits white light or the like toward a side end portion of the light guiding plate. After light emitted from the light source is incident from the side end portion of the light guiding plate, the light is emitted toward the electro-optical panel 5a while propagating inside the light guiding plate. Between the light guiding plate and the electro-optical panel 5a, a sheet-shaped optical member such as a light scattering sheet or a prism sheet may be disposed.

In the image generating device 5, on the display light emitting side of the electro-optical panel 5a, a first polarizing plate 81 is disposed in an overlapping manner. In addition, on the opposite side of the electro-optical panel 5a, a second polarizing plate 82 is disposed in an overlapping manner. The electro-optical panel 5a includes a translucent component substrate 50 that is disposed on a side opposite to the display light emitting side and a translucent opposing substrate 60 that is disposed on the display light emitting side so as to oppose the component substrate 50. The opposing substrate 60 and the component substrate 50 are bonded together by a rectangular frame-shaped sealing member 71, and a liquid crystal layer 55 is maintained within an area between the opposing substrate 60 and the component substrate 50 that is surrounded by the sealing member 71. On a face of the component substrate 50 that faces the opposing substrate 60, a plurality of pixel electrodes 58 are formed of a translucent conductive film such as an ITO (Indium Tin Oxide) film or an IZO (Indium Zinc Oxide) film. In addition, on a face of the opposing substrate 60 that faces the component substrate 50, a common electrode 68 is formed of a translucent conductive film such as an ITO film. In addition, on the opposing substrate 60, color filters are formed. In a case where the image generating device 5 is an IPS (In Plane Switching) type or an FFS (Fringe Field Switching) type, the common electrode 68 is disposed on the component substrate 50 side. The component substrate 50 may be disposed on the display light emitting side of the opposing substrate 60. A driving IC 75 is built in an overhang area 59 of the component substrate 50 that overhangs from the edge of the opposing substrate 60 using a COG technique, and the flexible wiring substrate 73 is connected to the overhang area 59. On the component substrate 50, a driving circuit may be formed simultaneously with a switching device disposed on the component substrate 50.

Detailed Configuration of Electrostatic Capacitance-Type Input Device 1

In the electrostatic capacitance-type input devices 1 shown in FIGS. 2A and 2B, the input panel 2 includes a translucent substrate 20 that is configured by a glass plate, a plastic plate, or the like. In this embodiment, a glass substrate is used as the substrate 20. In a case where the substrate 20 is formed from a plastic material, as the plastic material, a translucent sheet with heat resistance such as PET (polyethylene terephthalate), PC (polycarbonate), PES (polyether sulfone), PI (polyimide), or a cyclic olefin resin including polynorbornene or the like may be used. Hereinafter, the side of the substrate 20 on which an electrode and the like, to be described below, are formed will be described as the first face 20a, and the opposite side is described as the second face 20b.

Described in detail later, in the electrostatic capacitance-type input devices 1 shown in FIGS. 2A and 2B, on the first face 20a of the substrate 20, the first translucent conductive film 4a, an interlayer insulating film 214, and the second translucent conductive film 4b are formed from the lower layer side toward the upper layer side when viewed from the substrate 20. Thus, input position detecting electrodes 21 are formed of the second translucent conductive film 4b out of the first translucent conductive film 4a and the second translucent conductive film 4b. In the end portion 20e of the substrate 20, the flexible wiring substrate 35 is connected to the first face 20a. A translucent cover 90 having an insulating property is attached to the first face 20a side of the substrate 20 using an adhesive agent 90e or the like. In an area of the cover 90 that overlaps an outer area (the peripheral area 2b) of the input area 2a of the substrate 20, a light shielding layer 90a is printed. An area that is surrounded by the light shielding layer 90a is the input area 2a. The light shielding layer 90a overlaps the outer area of the electro-optical panel 5a and shields light leaking from the light source of the image generating device 5 or the end portion of the light guiding plate. In addition, between the input panel 2 and the liquid crystal panel 5a, a conductive film 99 used as a shield is arranged, in which a translucent conductive film such as an ITO film is formed on a translucent film. In FIG. 2B, the input panel 2 and the first polarizing plate 81 may be directly bonded to each other using an adhesive agent 90e or the like. In addition, in the case of the configuration shown in FIG. 2B, it may be configured that the substrate 20 is used as a cover, and the cover 90 is omitted.

Detailed Configuration of Electrostatic Capacitance-Type Input Device

Figure 3A:
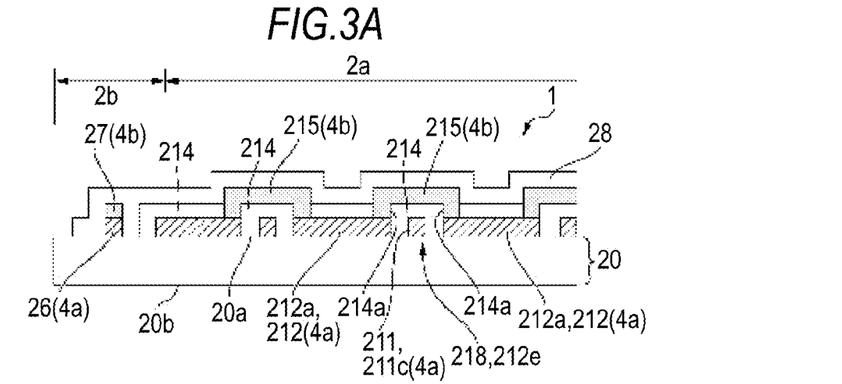
FIGS. 3A and 3B are explanatory diagrams showing the configuration of a substrate that is used in an electrostatic capacitance-type input device according to Embodiment 1 of the present application.
Figure 3B:
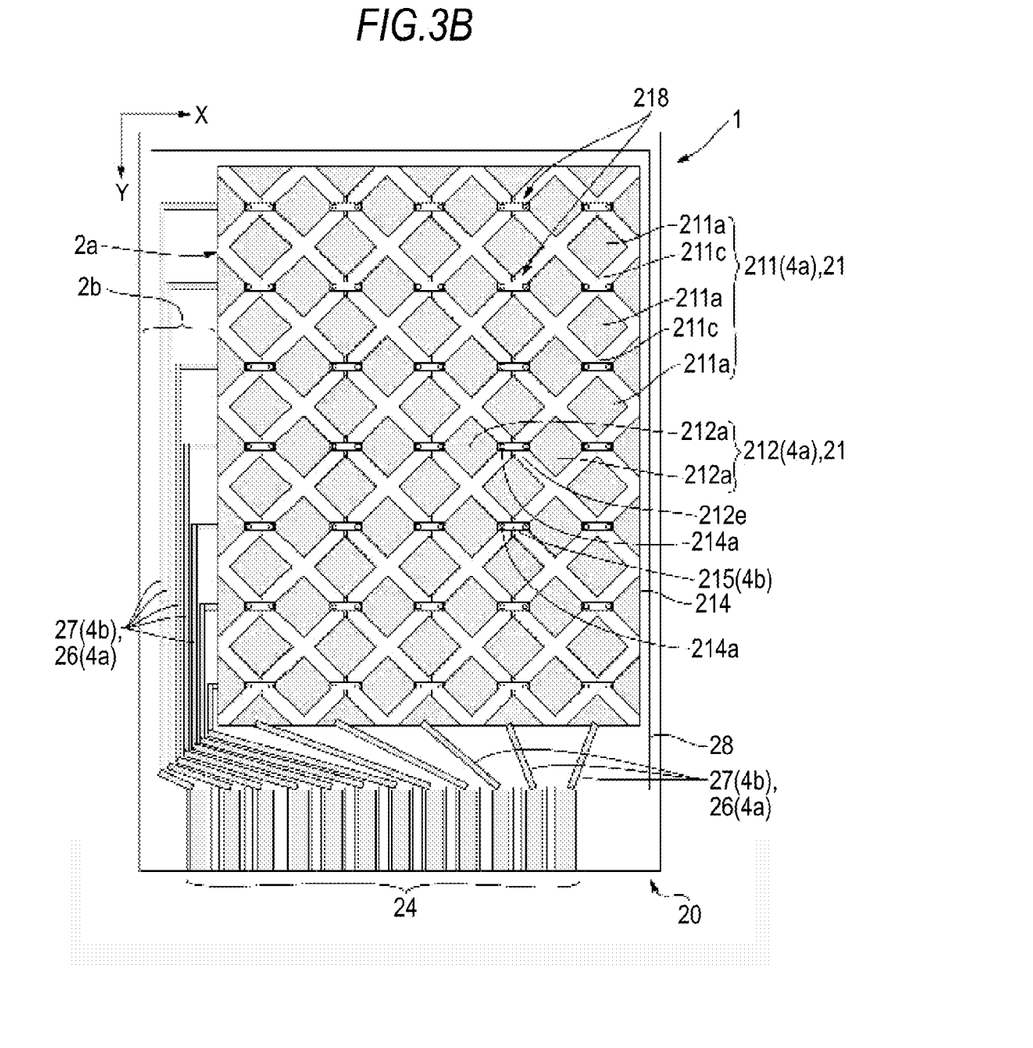

FIGS. 3A and 3B are explanatory diagrams showing the configuration of a substrate 20 that is used in the electrostatic capacitance-type input device 1 according to Embodiment 1 of the present application. FIG. 3A is an explanatory diagram showing the cross-sectional configuration of the substrate 20, and FIG. 3B is an explanatory diagram showing the planar configuration thereof.

As shown in FIGS. 3A and 3B, according to the electrostatic capacitance-type input device 1 of this embodiment, on the first face 20a side of the substrate 20, the first translucent conductive film 4a, the interlayer insulating film 214, and the second translucent conductive film 4b are sequentially formed from the lower layer side toward the upper layer side when viewed from the substrate 20.

In this embodiment, the first translucent conductive film 4a is configured by an ITO film with a film thickness in the range of 10 nm to 30 nm. The ITO film used as the first translucent conductive film 4a is polycrystalline, and, roughly, the sheet resistance is 100 $\Omega$/sq. The interlayer insulating film 214 is configured by a translucent insulating film such as a photosensitive resin film or a silicon oxide film.

In this embodiment, the second translucent conductive film 4b is configured by a translucent conductive film in which an IZO layer, a silver-based metal layer (a silver layer or an alloy layer with silver as its main component), and an IZO layer are stacked in the mentioned order, and the total thickness thereof is in the range of 80 nm to 120 nm. The sheet resistance of the second translucent conductive film 4b is typically 2 Ω/sq and is as low as being about 1/50 of the sheet resistance of the first translucent conductive film 4a. Here, the thicknesses of an IZO layer, a silver-based metal layer, and the IZO layer of the second translucent conductive film 4b are respectively in the ranges of 30 nm to 70 nm, 6 nm to 12 nm, and 30 nm to 40 nm. Since the second translucent conductive film 4b has the IZO layer that is amorphous and the silver-based metal layer that is thin, the second translucent conductive film 4b can be etched using an etching material that has etching selectivity for the first translucent conductive film 4a.

On the entirety of the first face 20a of the substrate 20, a translucent underlying protection film that is configured by a silicon oxide film or the like may be formed. In such a case, the first translucent conductive film 4a, the interlayer insulating film 214, and the second translucent conductive film 4b are sequentially stacked on the underlying protection film.

In the electrostatic capacitance-type input device 1 of this embodiment, the first translucent conductive film 4a, first, is formed as a plurality of rhombic areas in the input area 2a, and the rhombic areas configure pad portions 211a and 212a (large area portions) of the input position detecting electrodes 21 (the first electrode 211 and the second electrode 212). The pad portions 211a and 212a are alternately arranged in the Y direction and the X direction. Of a plurality of the pad portions 211a, the pad portions 211a that are adjacent to each other in the Y direction (the first direction) are connected through a connection portion 211c, and the pad portion 211a and the connection portion 211c configure the first electrode 211 that extends in the Y direction.

In contrast, although a plurality of the pad portions 212a configure the second electrode 212 extending in the X direction (the second direction), a portion between the pad portions 212a that are adjacent to each other in the X direction, that is, a portion overlapping the connection portion 211c includes a disconnected portion 212e.

The interlayer insulating film 214 is formed on the entirety of the input area 2a. In the interlayer insulating film 214, contact holes 214a are formed. The contact holes 214a are formed in positions that overlap end portions of the pad portion 212a facing each other through the disconnected portion 212e.

The second translucent conductive film 4b is formed as a relay electrode 215 in an area overlapping the contact hole 214a. In addition, the second translucent conductive film 4b is formed in the peripheral area 2b as a peripheral wiring 27 that is electrically connected to the input position detecting electrodes 21 (the first electrode 211 and the second electrode 212) and is formed as a mounting terminal 24 near the end portion 20e.

In addition, on the upper layer side of the second translucent conductive film 4b, an topcoat layer 28 that is formed from a photosensitive resin is formed on approximately the entire face of the substrate 20.

In addition, in this embodiment, the first translucent conductive film 4a is formed in the peripheral area 2b as an auxiliary wiring 26 extending so as to overlap the peripheral wiring 27. The auxiliary wiring 26 is directly brought into contact with the upper face of the peripheral wiring 27. Accordingly, a configuration in which the peripheral wiring 27 and the auxiliary wiring 26 are electrically connected in parallel is formed.

Configuration of Input Position Detecting Electrode 21

In the electrostatic capacitance-type input device 1 configured as described above, the first electrode 211 and the second electrode 212 are formed of the same conductive film (the first translucent conductive film 4a) and extend in directions intersecting each other. Accordingly, on the substrate 20, there is an intersection portion 218 in which the first electrode 211 and the second electrode 212 intersect each other.

Here, of the first electrode 211 and the second electrode 212, the first electrode 211 is connected in the Y direction by the connection portion 211c, which is configured by the second translucent conductive film 4b, so as to extend even into the intersection portion 218. In contrast, in the second electrode 212, the disconnected portion 212e is configured in the intersection portion 218. However, in the intersection portion 218, the relay electrode 215 is formed in the upper layer of the interlayer insulating film 214. Thus, the relay electrode 215 electrically connects the pads 212a, which are adjacent to each other through the disconnected portion 212e, through the contact holes 214a of the interlayer insulating film 214. Accordingly, the second electrode 212 extends in the X direction in the state of being electrically connected in the X direction. In addition, the relay electrode 215 overlaps the connection portion 211c through the interlayer insulating film 214. Accordingly, there is no concern about formation of a short circuit.

The first electrode 211 and the second electrode 212 configured as described above include rectangle-shaped pad portions 211a and 212a having a large area in an area pinched by the intersection portions 218. The connection portion 211c positioned in the intersection portion 218 of the first electrode 211 is in a small-width shape with a width smaller than that of the pad portions 211a and 212a. In addition, the relay electrode 215 is also formed in a small-width shape with a width smaller than that of the pad portions 211a and 212a.

Input Method

In the electrostatic capacitance-type input device 1 configured as described above, for example, a position detecting signal with a rectangular pulse shape is output to each of the input position detecting electrodes 21 (the first electrode 211 and the second electrode 212). As a result, when capacitance is not parasitic on the input position detecting electrode 21, the position detecting signal is output with the input waveform being maintained. In contrast, when capacitance is parasitic on the input position detecting electrode 21, the output waveform is distorted due to the capacitance. Accordingly, whether or not capacitance is parasitic on the input position detecting electrode 21 can be detected. Therefore, according to this embodiment, electrostatic capacitance coupled with each of the input position detecting electrodes 21 is monitored by sequentially outputting the position detecting signals to a plurality of the input position detecting electrodes 21. Thus, when a finger is in proximity to any of the plurality of the input position detecting electrodes 21, the electrostatic capacitance of the input position detecting electrode 21 to which the finger is in proximity increases by the amount corresponding to the electrostatic capacitance generated between the finger and the input position detecting electrode. Accordingly, the electrode to which the finger is in proximity can be specified.

Method of Manufacturing Electrostatic Capacitance-Type Input Device 1

FIGS. 4A to 4D are cross-sectional views representing the process according to a method of manufacturing an electrostatic capacitance-type input device 1 according to Embodiment 1 of the present application. In order to manufacture the electrostatic capacitance-type input device 1, first, in the first process shown in FIG. 4A, after the first translucent conductive film 4a is formed on a substrate 20, the first translucent conductive film 4a is patterned using a photolithography technology. More specifically, after an ITO film (the sheet resistance≈100 Ω/sq), which is polycrystalline, with a film thickness in the range of 10 nm to 30 nm is formed as the first translucent conductive film 4a, a resist mask is formed using a photolithography technology, and then, the first translucent conductive film 4a is etched. In such an etching process, wet etching is performed by using a ferric chloride-based etching solution, and then, the etching mask is removed by using a potassium hydroxide aqueous solution or the like. As a result, the first electrode 211 extending in the Y direction within an input area 2a on the substrate 20, the second electrode 212 extending in the X direction in the input area 2a, and an auxiliary wiring 26 extending in a peripheral area 2b are formed.

Figure 4A:
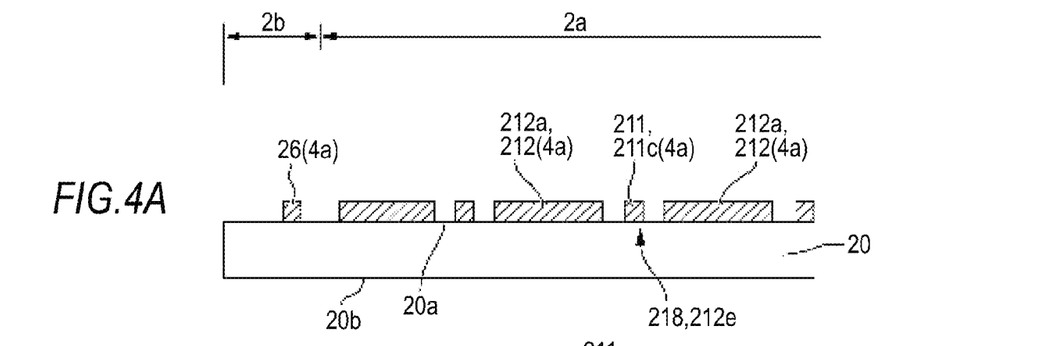
FIGS. 4A to 4D are cross-sectional views representing the process according to a method of manufacturing an electrostatic capacitance-type input device according to Embodiment 1 of the present application.
Figure 4B:
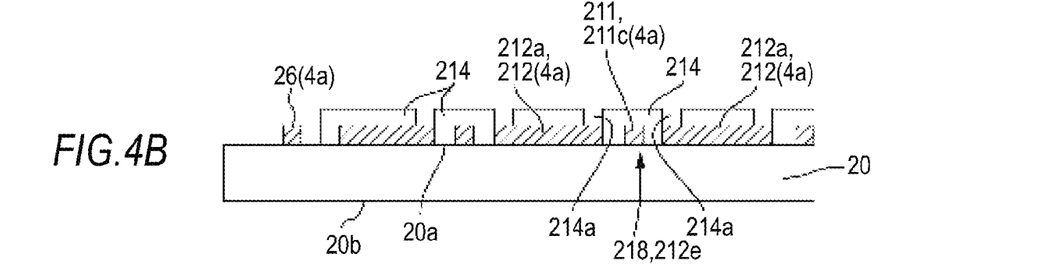

Next, in the second process shown in FIG. 4B, after an insulating film is formed on the substrate 20, the insulating film is patterned using a photolithography technology. As a result, in the entirety of the input area 2a including an intersection portion 218, an interlayer insulating film 214 with contact holes 214a is formed. In this embodiment, after the substrate is coated with a photosensitive resin, the coated substrate is exposed and developed, whereby the interlayer insulating film 214 is formed.

Figure 4C:
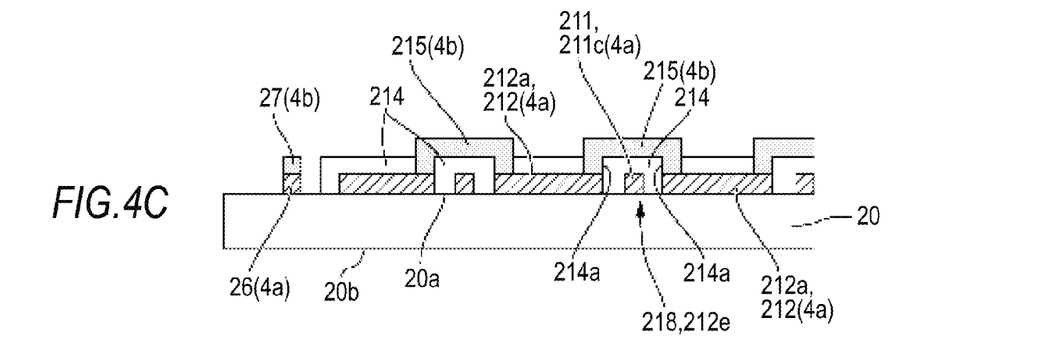

Next, in the third process shown in FIG. 4C, after the second translucent conductive film 4b with sheet resistance lower than the first translucent conductive film 4a is formed on the substrate 20, the second translucent conductive film 4b is patterned using a photolithography technology. More specifically, after a translucent conductive film (the sheet resistance≈2 Ω/sq) in which an IZO layer, a silver-based metal layer, and an IZO layer are stacked in the mentioned order is formed so as to have a film thickness in the range of 80 nm to 120 nm as the second translucent conductive film 4b, a resist mask is formed using a photolithography technology, and then, the second translucent conductive film 4b is etched. In such an etching process, wet etching is performed using an etching solution that is formed from a mixed aqueous solution containing 5%, 60%, and 35% of nitric acid, phosphoric acid, and acetic acid respectively, and then the etching mask is removed using a potassium hydroxide aqueous solution or the like. As a result, a relay electrode 215 that electrically connects the second electrodes 212 that are disconnected by the intersection portion 218 and a peripheral wiring 27 extending in the peripheral area 2b are formed. Here, since the etching solution used for etching the second translucent conductive film 4b has etching selectivity for the first translucent conductive film 4a, an auxiliary wiring 26 formed in advance is not dissolved. In addition, since the first electrode 211 and the second electrode 212 formed in advance are covered with the interlayer insulating film 214, the first electrode 211 and the second electrode 212 are not etched in the etching process for the second translucent conductive film 4b.

Figure 4D:
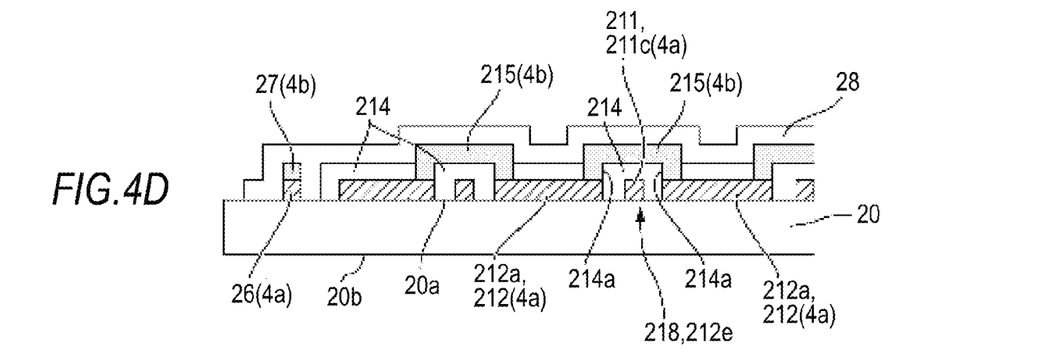

Thereafter, as shown in FIG. 4D, an topcoat layer 28 that is formed from an organic film such as a photosensitive resin or an inorganic film is formed.

Operations and Advantages of this Embodiment

As described above, according to this embodiment, the first electrode 211, the second electrode 212, the interlayer insulating film 214, the relay electrode 215, and the peripheral wiring 27 of the electrostatic capacitance-type input device 1 can be formed of three films including the first translucent conductive film 4a, the interlayer insulating film 214, and the second translucent conductive film 4b. Therefore, according to this embodiment, a total of three patterning processes are sufficient, and accordingly, the productivity is high. In addition, since the second translucent conductive film 4b has sheet resistance lower than the first translucent conductive film 4a, the peripheral wiring 27 with low resistance can be configured without forming the peripheral wiring 27 with a metal film.

In addition, the first translucent conductive film 4a configures an auxiliary wiring 26 that extends so as to overlap the peripheral wiring 27 and is electrically connected to the peripheral wiring 27 in parallel. Thus, since the peripheral wiring 27 and the auxiliary wiring 26 are electrically connected together in parallel, the wiring resistance can be decreased. In addition, a redundant wiring structure capable of transferring a signal even in a case where one wiring is cut off can be realized.

In addition, according to this embodiment, since the translucent conductive film in which the IZO layer, the silver-based metal layer, and the IZO layer are stacked is used as the second translucent conductive film 4b, the second translucent conductive film 4b can be etched by an etching material that has etching selectivity for the first translucent conductive film 4a. Thus, when the second translucent conductive film 4b is etched, the auxiliary wiring 26 formed in advance is not dissolved. Therefore, even in the peripheral wiring 27, the auxiliary wiring 26 is not necessarily formed to have an excessively large width, and accordingly, the width dimension of the peripheral area 2b may be small.

In addition, according to this embodiment, the first electrode 211 and the second electrode 212 formed in advance are covered with the interlayer insulating film 214, and accordingly, the first electrode 211 and the second electrode 212 are not etched when the second translucent conductive film 4b is etched.

Modified Example 1 of Embodiment 1

In Embodiment 1, although the translucent conductive film in which the IZO layer, the silver-based metal layer, and the IZO layer are stacked is used as the second translucent conductive film 4b, the first electrode 211 and the second electrode 212 formed in advance are covered with the interlayer insulating film 214 when the second translucent conductive film 4b is etched in Embodiment 1. Accordingly, in a case where the width dimension of the periphery area 2b may be broadened more or less, a translucent conductive film in which an ITO layer, a silver-based metal layer, and an ITO layer are stacked may be used as the second translucent conductive film 4b. Since such a translucent conductive film has sheet resistance lower than the first translucent conductive film 4a, the peripheral wiring 27 with low resistance can be configured without forming the peripheral wiring 27 with a metal film.

In addition, in a case where the translucent conductive film in which the ITO layer, the silver-based metal layer, and the ITO layer are stacked is used as the second translucent conductive film 4b, as an etching solution that is used in the patterning process, a ferric chloride-based etching solution is used. In such a case, when the width dimension of the peripheral wiring 27 is set to be larger than that of the auxiliary wiring 26, the auxiliary wiring 26 can be prevented from being etched when the second translucent conductive film 4b is etched.

Modified Example 2 of Embodiment 1

Also in this example, similarly to Modified Example 1 of Embodiment 1, the translucent conductive film in which the ITO layer, the silver-based metal layer, and the ITO layer are stacked is used as the second translucent conductive film 4b. Accordingly, as an etching solution that is used in the patterning process, a ferric chloride-based etching solution is used. Thus, in this example, the interlayer insulating film 214 is left to remain in the peripheral area 2b so as to cover the auxiliary wiring 26 formed in advance. According to such a configuration, the auxiliary wiring 26 is prevented from being etched when the second translucent conductive film 4b is etched. Accordingly, a configuration in which the peripheral wiring 27 is formed in a large width so as to protect the auxiliary wiring 26 from the etching solution is not necessarily employed.

According to such a configuration, although the interlayer insulating film 214 is placed between the auxiliary wiring 26 and the peripheral wiring 27, the auxiliary wiring 26 and the peripheral wiring 27 can be electrically connected in parallel by electrically connecting the auxiliary wiring 26 and the peripheral wiring 27 through a contact hole (an area in which the interlayer insulating film 214 is not formed) formed in the interlayer insulating film 214 at least in two spots in the extending direction.

In addition, the configuration in which the interlayer insulating film 214 is placed between the auxiliary wiring 26 and the peripheral wiring 27 may be applied to a case where the translucent conductive film in which the IZO layer, the silver-based metal layer, and the IZO layer are stacked is used as the second translucent conductive film 4b.

Embodiment 2

Detailed Configuration of Electrostatic Capacitance-Type Input Device

Figure 5A:
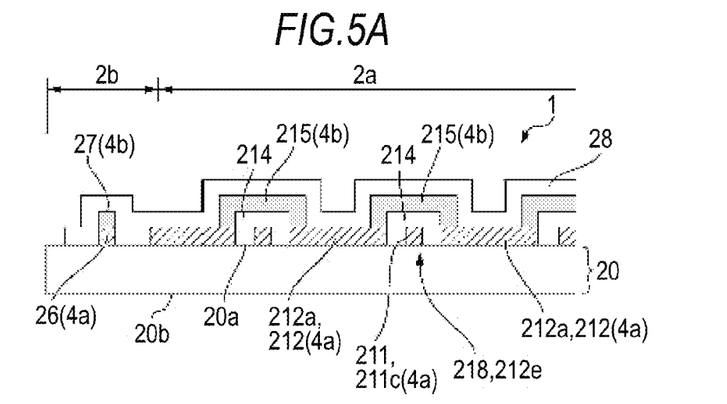
FIGS. 5A and 5B are explanatory diagrams showing the configuration of a substrate that is used in an electrostatic capacitance-type input device according to Embodiment 2 of the present application.
Figure 5B:
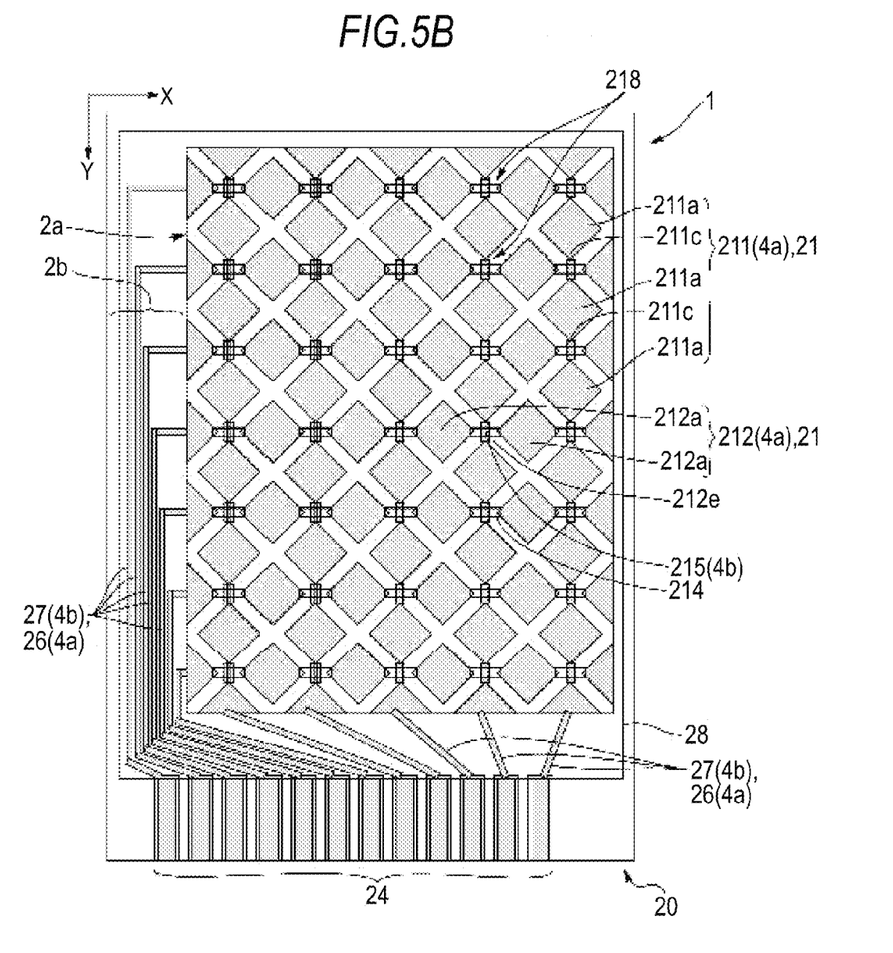

FIGS. 5A and 5B are explanatory diagrams showing the configuration of a substrate 20 that is used in an electrostatic capacitance-type input device 1 according to Embodiment 2 of the present application. FIG. 5A is an explanatory diagram showing the cross-sectional configuration of the substrate 20, and FIG. 5B is an explanatory diagram showing the planar configuration thereof. The basic configuration of this embodiment is the substantially the same as that of Embodiment 1. Thus, to each common part, the same reference sign is assigned, and the description thereof is omitted.

As shown in FIGS. 5A and 5B, according to the electrostatic capacitance-type input device 1 of this embodiment, similarly to Embodiment 1, on the first face 20a side of the substrate 20, the first translucent conductive film 4a, the interlayer insulating film 214, and the second translucent conductive film 4b are sequentially formed from the lower layer side toward the upper layer side when viewed from the substrate 20. In this embodiment, the first translucent conductive film 4a is configured by an ITO film with a film thickness in the range of 10 nm to 30 nm. The ITO film used as the first translucent conductive film 4a is polycrystalline, and, typically, the sheet resistance is 100 Ω/sq. The interlayer insulating film 214 is configured by a translucent insulating film such as a photosensitive resin film or a silicon oxide film. The second translucent conductive film 4b is configured by a translucent conductive film in which an IZO layer, a silver-based metal layer, and an IZO layer are stacked in the mentioned order, and the total thickness thereof is in the range of 80 nm to 120 nm. The sheet resistance of the second translucent conductive film 4b is typically 2 Ω/sq and is as low as being about 1/50 of the sheet resistance of the first translucent conductive film 4a. Here, the thicknesses of the IZO layer, the silver-based metal layer, and the IZO layer of the second translucent conductive film 4b are respectively in the ranges of 30 nm to 70 nm, 6 nm to 12 nm, and 30 nm to 40 nm.

The first translucent conductive film 4a configures the input position detecting electrodes 21 (the first electrode 211 and the second electrode 212), and the second electrode 212 has a disconnected portion 212e in the intersection portion 218 with the first electrode 211.

In this embodiment, differently from Embodiment 1, the interlayer insulating film 214 is formed only in the intersection portion 218 of the first electrode 211 and the second electrode 212 in the input area 2a, and the other area becomes an area in which the interlayer insulating film 214 is not formed.

The second translucent conductive film 4b is formed as a relay electrode 215 on the upper layer side of the interlayer insulating film 214. In addition, the second translucent conductive film 4b is formed as a peripheral wiring 27 that is electrically connected to the input position detecting electrodes 21 (the first electrode 211 and the second electrode 212) in the peripheral area 2b, and is formed as a mounting terminal 24 in an area near the end portion 20e.

In addition, on the upper layer side of the second translucent conductive film 4b, a topcoat layer 28 that is formed from an organic film such as a photosensitive resin or an inorganic film is formed on approximately the entire face of the substrate 20.

In addition, in this embodiment, the first translucent conductive film 4a is formed in the peripheral area 2b as an auxiliary wiring 26 extending so as to overlap the peripheral wiring 27. The auxiliary wiring 26 is directly brought into contact with the upper face of the peripheral wiring 27. Accordingly, a configuration in which the peripheral wiring 27 and the auxiliary wiring 26 are electrically connected in parallel is formed.

In the electrostatic capacitance-type input device 1 configured as described above, the disconnected portion 212e in the intersection portion 218 is configured in the second electrode 212. However, the relay electrode 215 electrically connects the pads 212a that are adjacent to each other through the disconnected portion 212e in the area in which the interlayer insulating film 214 is not formed. Accordingly, the second electrode 212 extends in the X direction in the state of being electrically connected in the X direction.

Method of Manufacturing Electrostatic Capacitance-Type Input Device 1

FIGS. 6A to 6D are cross-sectional views representing the process according to a method of manufacturing an electrostatic capacitance-type input device 1 according to Embodiment 1 of the present application. In order to manufacture the electrostatic capacitance-type input device 1 of this embodiment, first, in the first process shown in FIG. 6A, after the first translucent conductive film 4a is formed on a substrate 20, the first translucent conductive film 4a is patterned using a photolithography technology. More specifically, after an ITO film (the sheet resistance≈100 Ω/sq), which is polycrystalline, with a film thickness in the range of 10 nm to 30 nm is formed as the first translucent conductive film 4a, a resist mask is formed using a photolithography technology, and then, the first translucent conductive film 4a is etched. In such an etching process, wet etching is performed using a ferric chloride-based etching solution, and then, the etching mask is removed using a potassium hydroxide aqueous solution or the like. As a result, the first electrode 211 extending in the Y direction within an input area 2a on the substrate 20, the second electrode 212 extending in the X direction in the input area 2a, and an auxiliary wiring 26 extending in a peripheral area 2b are formed.

Figure 6A:
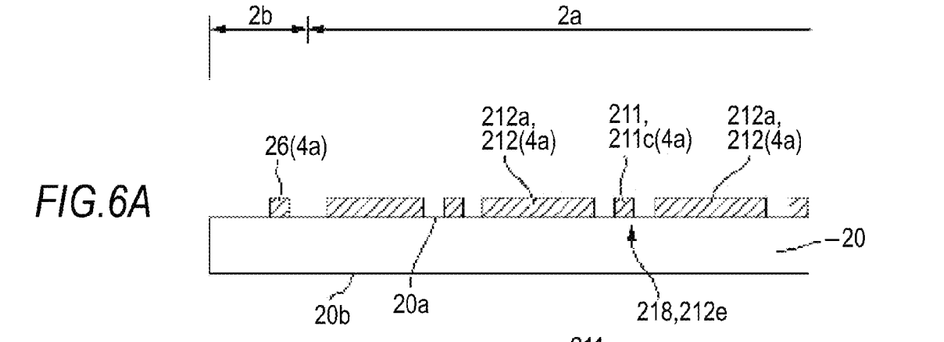
FIGS. 6A to 6D are cross-sectional views representing the process according to a method of manufacturing an electrostatic capacitance-type input device according to Embodiment 2 of the present application.
Figure 6B:
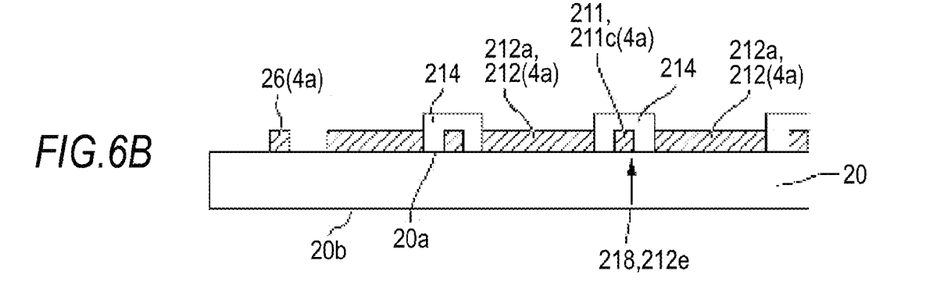

Next, in the second process shown in FIG. 6B, after an insulating film is formed on the substrate 20, the insulating film is patterned using a photolithography technology. As a result, the interlayer insulating film 214 is formed only in the intersection portion 218. In this embodiment, after the substrate is coated with a photosensitive resin, the coated substrate is exposed and developed, whereby the interlayer insulating film 214 is formed.

Figure 6C:
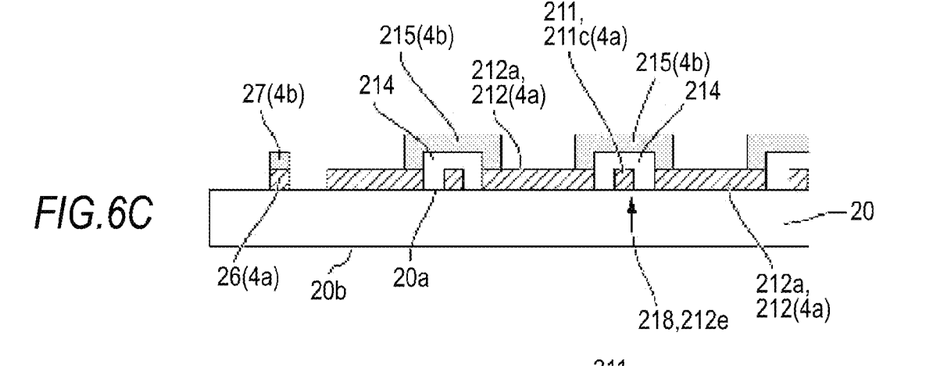

Next, in the third process shown in FIG. 6C, after the second translucent conductive film 4b with sheet resistance lower than the first translucent conductive film 4a is formed on the substrate 20, the second translucent conductive film 4b is patterned using a photolithography technology. More specifically, after a translucent conductive film (the sheet resistance≈2 Ω/sq) in which an IZO layer, a silver-based metal layer, and an IZO layer are stacked in the mentioned order is formed so as to have a film thickness in the range of 80 nm to 120 nm as the second translucent conductive film 4b, a resist mask is formed using a photolithography technology, and then, the first translucent conductive film 4a is etched. In such an etching process, wet etching is performed using an etching solution that is formed from a mixed aqueous solution containing 5%, 60%, and 35% of nitric acid, phosphoric acid, and acetic acid, and then, the etching mask is removed using a potassium hydroxide aqueous solution or the like. As a result, a relay electrode 215 that electrically connects the second electrodes 212 that are disconnected by the intersection portion 218 and a peripheral wiring 27 extending in the peripheral area 2b are formed. Here, since the etching solution used for etching the second translucent conductive film 4b has etching selectivity for the first translucent conductive film 4a, the first electrode 211, the second electrode 212, and the auxiliary wiring 26 that are formed in advance are not etched.

Figure 6D:
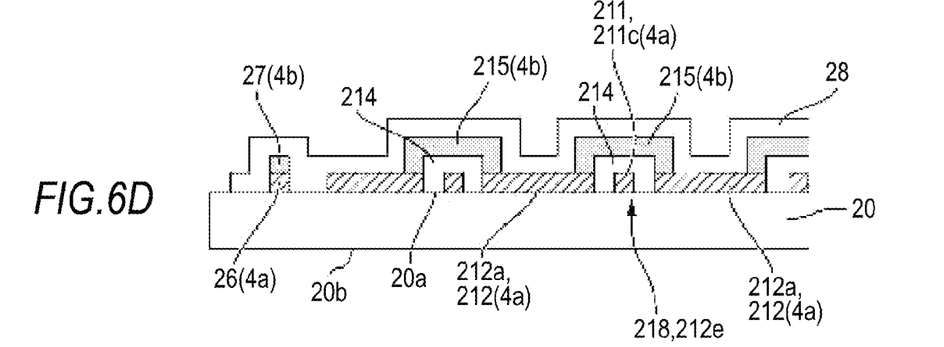

Thereafter, as shown in FIG. 6D, an topcoat layer 28 that is formed from an organic film such as a photosensitive resin or an inorganic film is formed.

Operations and Advantages of this Embodiment

As described above, according to this embodiment, the first electrode 211, the second electrode 212, the interlayer insulating film 214, the relay electrode 215, and the peripheral wiring 27 of the electrostatic capacitance-type input device 1 can be formed of three films including the first translucent conductive film 4a, the interlayer insulating film 214, and the second translucent conductive film 4b. Therefore, according to this embodiment, a total of three patterning processes are performed, and accordingly, the productivity is high. In addition, since the second translucent conductive film 4b has sheet resistance lower than the first translucent conductive film 4a, the peripheral wiring 27 with low resistance can be configured without forming the peripheral wiring 27 with a metal film.

In addition, the relay electrode 215 is arranged in a translucent conductive film pattern with a small area of a thin and long shape. Accordingly, the relay electrode 215 is not visually recognized, and the display quality of the liquid crystal panel is not degraded.

In addition, the first translucent conductive film 4a configures the auxiliary wiring 26 that extends so as to overlap the peripheral wiring 27 and is electrically connected to the peripheral wiring 27 in parallel. Thus, since the peripheral wiring 27 and the auxiliary wiring 26 are electrically connected together in parallel, the wiring resistance can be decreased. In addition, a redundant wiring structure capable of transferring a signal even in a case where one wiring is cut off can be realized.

In addition, according to this embodiment, since the translucent conductive film in which the IZO layer, the silver-based metal layer, and the IZO layer are stacked is used as the second translucent conductive film 4b, the second translucent conductive film 4b can be etched by an etching material that has etching selectivity for the first translucent conductive film 4a. Thus, when the second translucent conductive film 4b is etched, the first electrode 211 and the second electrode 212 formed in advance are not dissolved. Therefore, even in a case where the interlayer insulating film 214 is formed only in the intersection portion 218, the first electrode 211, the second electrode 212, the interlayer insulating film 214, the relay electrode 215, and the peripheral wiring 27 of the electrostatic capacitance-type input device 1 can be formed of three films including the first translucent conductive film 4a, the interlayer insulating film 214, and the second translucent conductive film 4b.

In addition, when the second translucent conductive film 4b is etched, the auxiliary wiring 26 formed in advance is not dissolved. Therefore, in the peripheral wiring 27, the auxiliary wiring 26 is not necessarily formed to have an excessively large width, and accordingly, the width dimension of the peripheral area 2b may be small.

Modified Example of Embodiment 2

According to this embodiment, similarly to Modified Example 2 of Embodiment 1, the interlayer insulating film 214 may be placed between the auxiliary wiring 26 and the peripheral wiring 27. Even in such as case, the auxiliary wiring 26 and the peripheral wiring 27 can be electrically connected in parallel by electrically connecting the auxiliary wiring 26 and the peripheral wiring 27 at least in two spots in the extending direction.

Other Embodiments

In the embodiments, a liquid crystal device is used as the image generating device 5. However, as the image generating device 5, an organic electroluminescent device may be used.

Examples of Mounting in Electronic Apparatus

Figure 7A:
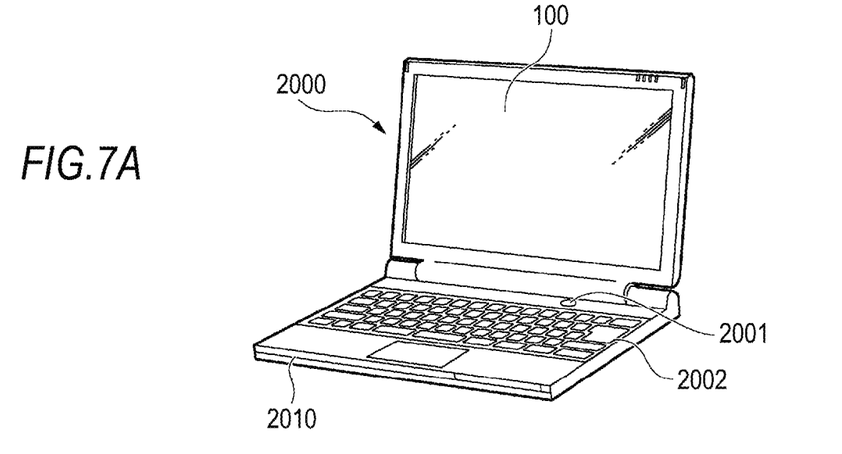
FIGS. 7A to 7C are explanatory diagrams of electronic apparatuses having an input device-attached electro-optical apparatus according to an embodiment.
Figure 7B:
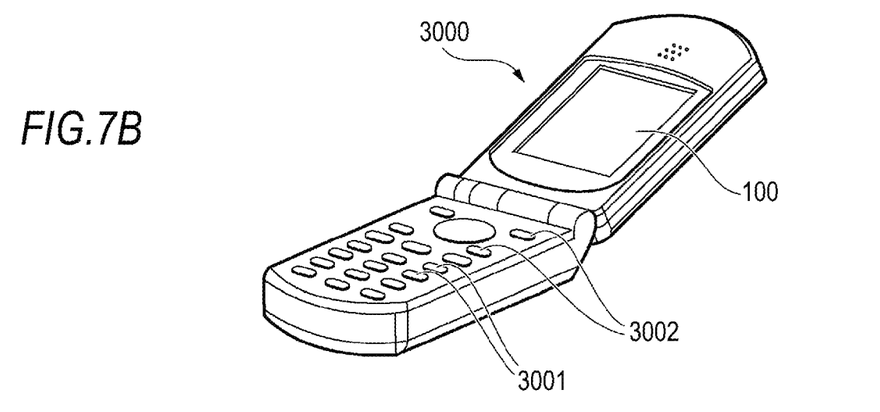
Figure 7C:
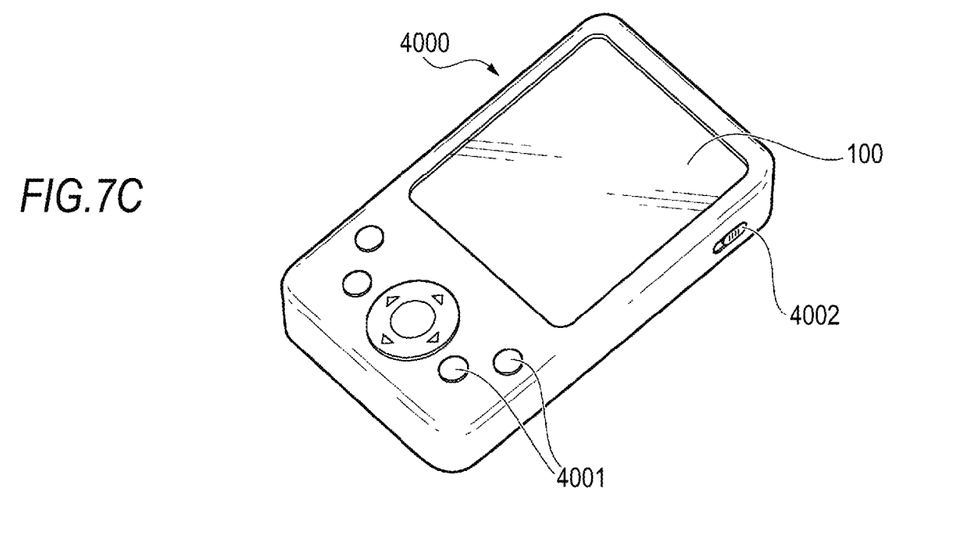

Next, electronic apparatuses to which input device-attached electro-optical apparatuses 100 according to the embodiments are applied will be described. FIGS. 7A to 7C are explanatory diagrams of electronic apparatuses with an input device-attached electro-optical apparatus 100 according to an embodiment. FIG. 7A represents the configuration of a mobile-type personal computer including the input device-attached electro-optical apparatus 100. The personal computer 2000 includes the input device-attached electro-optical apparatus 100 as a display unit and a main body unit 2010. In the main body unit 2010, a power switch 2001 and a keyboard 2002 are disposed. FIG. 7B represents the configuration of a cellular phone including the input device-attached electro-optical apparatus 100. The cellular phone 3000 includes a plurality of operation buttons 3001, scroll buttons 3002, and the input device-attached electro-optical apparatus 100 as a display unit. By operating the scroll buttons 3002, the screen displayed in the input device-attached electro-optical apparatus 100 is scrolled. FIG. 7C represents the configuration of a personal digital assistant (PDA) to which the input device-attached electro-optical apparatus 100 is applied. The personal digital assistant 4000 has a plurality of operation buttons 4001, a power switch 4002, and the input device-attached electro-optical apparatus 100 as a display unit. When the power switch 4002 is operated, various types of information such as an address list or a schedule book are displayed in the input device-attached electro-optical apparatus 100.

In addition, as examples of electronic apparatuses, to which the input device-attached electro-optical apparatus 100 is applied, other than the electronic apparatuses shown in FIGS. 7A to 7C, there are electronic apparatuses such as a digital still camera, a liquid crystal television set, a view finder-type or monitor direct-viewing-type video cassette recorder, a car navigation system, a pager, an electronic organizer, a calculator, a word processor, a workstation, a television phone, a POS terminal, and a banking terminal. As a display unit of the above-described various electronic apparatuses, the above-described input device-attached electro-optical apparatus 100 can be applied.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An electrostatic capacitance-type input device comprising:

a first translucent conductive film that configures a first electrode that extends in a first direction in an input area on a substrate and second electrodes that extend in a second direction intersecting the first direction in the input area and are disconnected in intersection portions with the first electrode;

an interlayer insulating film that is formed at least in areas overlapping the intersection portions; and a second translucent conductive film that is formed on the interlayer insulating film and that has a sheet resistance lower than that of the first translucent conductive film, the second translucent conductive film configuring:
relay electrodes that electrically connect the second electrodes disconnected in the intersection portion by electrically connecting the second electrodes in an area in which the interlayer insulating film is not formed; and
a peripheral wiring extending in a peripheral area of the substrate located to an outer side of the input area,
wherein the first translucent conductive film configures an auxiliary wiring that extends so as to overlap the peripheral wiring and is electrically connected to the peripheral wiring in parallel.

2. The electrostatic capacitance-type input device according to claim 1, wherein the interlayer insulating film is formed in an area overlapping the first electrode and in areas overlapping the second electrodes.

3. The electrostatic capacitance-type input device according to claim 2, wherein the interlayer insulating film is formed between layers of the peripheral wiring and the auxiliary wiring.

4. The electrostatic capacitance-type input device according to claim 2, wherein the second translucent conductive film is a translucent conductive film in which an ITO layer, a silver-based metal layer, and an ITO layer are stacked.

5. The electrostatic capacitance-type input device according to claim 1, wherein in the input area the interlayer insulating film is formed exclusively in areas of the input area that overlap the intersection portions.

6. The electrostatic capacitance-type input device according to claim 1, wherein the second translucent conductive film can be etched by an etching material that has etching selectivity for the first translucent conductive film.

7. The electrostatic capacitance-type input device according to claim 1, wherein the second translucent conductive film is a translucent conductive film in which an IZO layer, a silver-based metal layer, and an IZO layer are stacked.

* * * * *